(12) United States Patent
Takasao

(10) Patent No.: US 11,142,191 B2
(45) Date of Patent: Oct. 12, 2021

(54) DRIVING SUPPORT APPARATUS

(71) Applicant: DENSO CORPORATION, Kariya (JP)

(72) Inventor: Daisuke Takasao, Kariya (JP)

(73) Assignee: DENSO CORPORATION, Kariya (JP)

( * ) Notice: Subject to any disclaimer, the term of this patent is extended or adjusted under 35 U.S.C. 154(b) by 314 days.

(21) Appl. No.: 16/288,517

(22) Filed: Feb. 28, 2019

(65) Prior Publication Data

US 2019/0270448 A1    Sep. 5, 2019

(30) Foreign Application Priority Data

Mar. 2, 2018   (JP) .............................. JP2018-037019

(51) Int. Cl.
*B60W 30/09* (2012.01)
*B60W 10/18* (2012.01)
*B60W 10/20* (2006.01)

(52) U.S. Cl.
CPC ............ *B60W 30/09* (2013.01); *B60W 10/18* (2013.01); *B60W 10/20* (2013.01); *B60W 2554/80* (2020.02)

(58) Field of Classification Search
CPC ...... B60W 30/09; B60W 10/18; B60W 10/20; B60W 2554/80
See application file for complete search history.

(56) References Cited

U.S. PATENT DOCUMENTS

| 9,775,004 | B2 * | 9/2017 | Cawse .................. G07B 15/00 |
| 10,730,521 | B2 * | 8/2020 | Likhachev ...... B60W 30/18163 |
| 2005/0015203 | A1 * | 1/2005 | Nishira .................. G08G 1/167 701/301 |
| 2010/0161192 | A1 * | 6/2010 | Nara ...................... G01C 21/26 701/70 |
| 2016/0339959 | A1 * | 11/2016 | Lee ..................... G06K 9/00798 |
| 2017/0018189 | A1 * | 1/2017 | Ishikawa .............. G05D 1/0088 |
| 2017/0210383 | A1 | 7/2017 | Nishimura |
| 2018/0354518 | A1 * | 12/2018 | Inou ..................... G05D 1/0214 |
| 2019/0071099 | A1 * | 3/2019 | Nishiguchi ........ B62D 15/0255 |
| 2019/0084572 | A1 * | 3/2019 | Oishi ....................... B62D 6/00 |

FOREIGN PATENT DOCUMENTS

JP        2017-134518 A      8/2017

* cited by examiner

*Primary Examiner* — Hussein Elchanti
(74) *Attorney, Agent, or Firm* — Maschoff Brennan

(57) ABSTRACT

In a driving support apparatus mounted in an own vehicle, an obstacle detector detects an obstacle present on a front side in a traveling lane. A rear vehicle detector detects a rear vehicle. An operation controller determines an avoiding operation by one of a lane change operation for changing to a lane adjacent to the traveling lane, a steering operation for steering in the traveling lane, and a braking operation for applying a brake in the traveling lane and controlling the own vehicle to perform the avoiding operation to avoid the obstacle. A collision estimator estimates presence or absence of a collision between the rear vehicle and the obstacle in a case in which the own vehicle performs the avoiding operation by one of the lane change operation and the steering operation. The operation controller determines the avoiding operation based on the estimated presence or absence of the collision.

12 Claims, 6 Drawing Sheets

DRIVING SUPPORT APPARATUS

CROSS-REFERENCE TO RELATED APPLICATION

This application is based on and claims the benefit of priority from earlier Japanese Patent Application No. 2018-37019 filed Mar. 2, 2018, the description of which is incorporated herein by reference.

BACKGROUND

Technical Field

The present disclosure relates to a driving support apparatus.

Related Art

Various apparatuses have been proposed as a driving support apparatus for supporting driving of a vehicle to support operations for avoiding an obstacle present in front of an own vehicle. For example, a known driving support apparatus is configured such that an own vehicle avoids an obstacle by steering control within the same lane. When the own vehicle may collide with a vehicle traveling behind the own vehicle, such as a motorcycle, by performing such steering control, performing the steering control is prohibited.

SUMMARY

One aspect of the present disclosure provides a driving support apparatus mounted in an own vehicle. In the driving support apparatus, an obstacle detector detects an obstacle present on a front side in a traveling lane. A rear vehicle detector detects a rear vehicle. An operation controller determines an avoiding operation by one of a lane change operation for changing to a lane adjacent to the traveling lane, a steering operation for steering in the traveling lane, and a braking operation for applying a brake in the traveling lane and controlling the own vehicle to perform the avoiding operation to avoid the obstacle. A collision estimator estimates presence or absence of a collision between the rear vehicle and the obstacle in a case in which the own vehicle performs the avoiding operation by one of the lane change operation and the steering operation. The operation controller determines the avoiding operation based on the estimated presence or absence of the collision.

DESCRIPTION OF SPECIFIC EMBODIMENTS

A. First Embodiment

A-1. Overall Configuration

Figure 1:
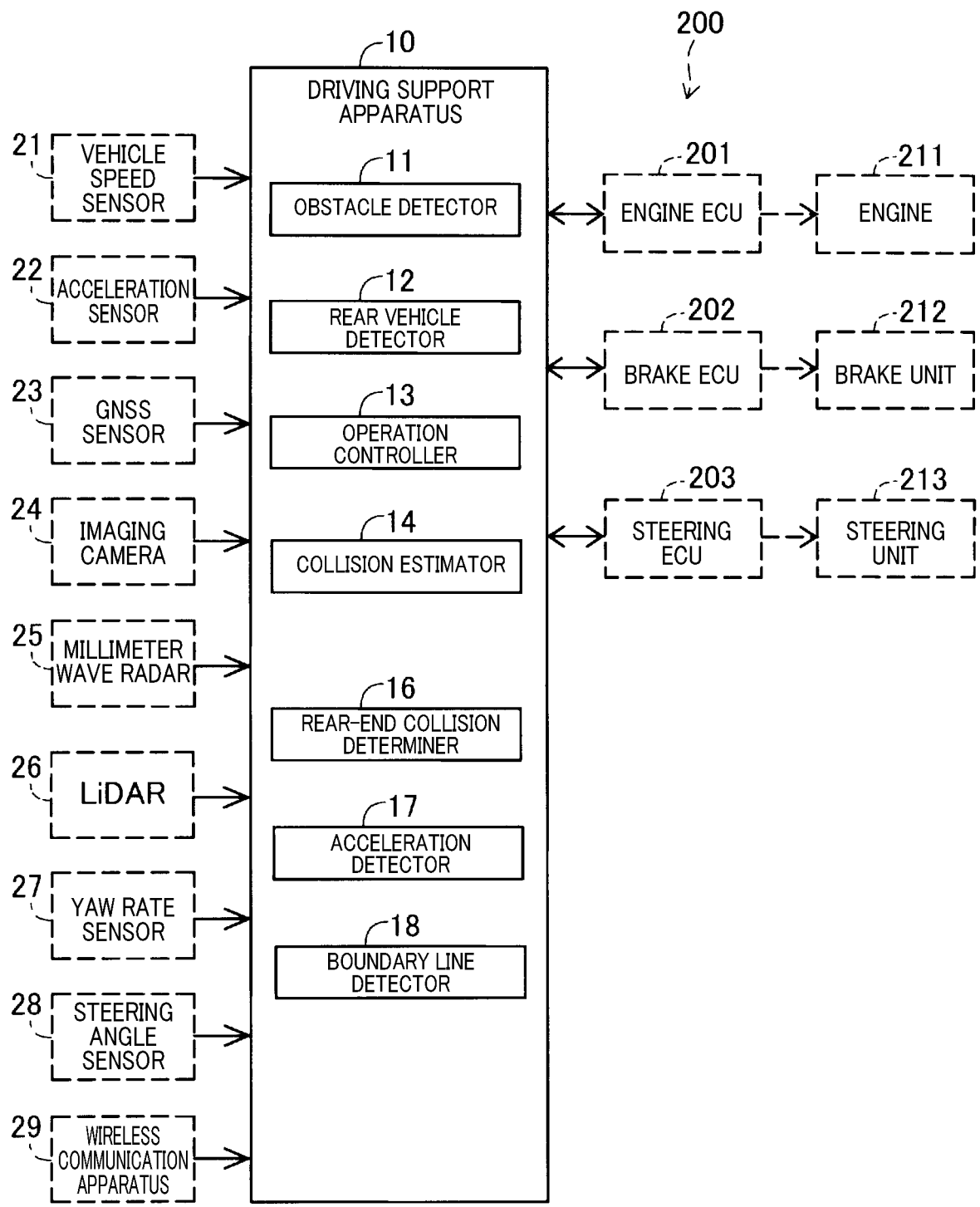
FIG. 1 is a block diagram showing a schematic configuration of a driving support apparatus.

Referring to FIG. 1, a driving support apparatus 10 according to the first embodiment of the present disclosure is mounted in a vehicle and supports driving of the vehicle. In the present embodiment, the vehicle in which the driving support apparatus 10 is mounted is also referred to as the own vehicle. Driving support described above means automatically performing an engine control, a brake control, and a steering control of the own vehicle on behalf of a driver or supporting such a control operated by the driver to be performed. Supporting such a control operated by the driver to be performed means, for example, automatically performing an engine control, a brake control, and a steering control so that the own vehicle moves to the right side when the driver intends to change the lane in order to avoid the obstacle present on the front side in the traveling lane with respect to the own vehicle and turns on the right direction indicator. The driving support apparatus 10 is not limited to the case of avoiding an obstacle present on the front side in the traveling lane, but may support driving of the own vehicle in any other situation while the own vehicle is traveling. In the present embodiment, the driving support apparatus 10 is constituted by an Electronic Control Unit (ECU) that includes a microcomputer and a memory that are mounted.

The driving support apparatus 10 is electrically connected to a vehicle speed sensor 21, an acceleration sensor 22, a Global Navigation Satellite System (GNSS) sensor 23, an imaging camera 24, a millimeter wave radar 25, a Light Detection And Ranging or a Laser Imaging Detection And Ranging (LiDAR) sensor 26, a yaw rate sensor 27, a steering angle sensor 28, and a wireless communication apparatus 29. The driving support apparatus 10 acquires measured values and communication contents obtained by the above sensors and apparatus and instructs an operation control apparatus 200 to control operations based on the measured values and the communication contents.

The vehicle speed sensor 21 detects the speed of the own vehicle. The acceleration sensor 22 detects the acceleration of the own vehicle. The GNSS sensor 23 is constituted, for example, by a Global Positioning System (GPS) sensor and detects the current position of the own vehicle based on radio waves received from artificial satellites constituting the GPS. The imaging camera 24 is directed to the outside of the own vehicle and acquires at least captured images of the front side and the rear side of the own vehicle. A monocular camera may be used as the imaging camera 24. A stereo camera or a multi camera that is constituted by two or more cameras may be used. The millimeter wave radar 25 uses radio waves in the millimeter wave band to detect the presence or absence of an object around the own vehicle, the distance between the object and the own vehicle, the position of the object, the size of the object, the shape of the object, and the relative speed of the object with respect to the own vehicle. The object detected by the millimeter wave radar 25 is more precisely a set of a plurality of detection points (targets). The LiDAR sensor 26 detects the presence or absence of an object around the own vehicle by using laser. The yaw rate sensor 27 detects a yaw rate (rotational angular velocity) of the own vehicle. The steering angle sensor 28 detects a steering angle of the steering wheel of the own vehicle. The wireless communication apparatus 29 performs wireless communication with an Intelligent Transportation System (ITS), inter-vehicle communication with other vehicles, and road-to-vehicle communication with roadside wireless apparatuses installed in road facilities. Thus, the information on the situation of the own vehicle and the surrounding situation can be exchanged with other vehicles.

The operation control apparatus 200 serves as a functional unit that controls operations of the own vehicle. In the present embodiment, the operation control apparatus 200 includes an engine ECU 201, a brake ECU 202, and a steering ECU 203. The engine ECU 201 controls the operation of an engine 211. Specifically, the engine ECU 201 controls various actuators not shown to control an opening and closing operation of a throttle valve, an ignition operation of an igniter, an opening and closing operation of an intake valve. The brake ECU 202 controls a brake unit 212. The brake unit 212 includes a group of devices (actuator) including a sensor, a motor, a valve, and a pump, which are related to brake control. The brake ECU 202 determines a timing at which a brake is applied and a brake amount and controls each device constituting the brake unit 212 so that the determined brake amount is obtained at the determined timing. The steering ECU 203 controls a steering unit 213. The steering unit 213 is constituted by a group of devices (actuator) including a power steering motor, which are related to a steering operation. The steering ECU 203 determines a steering amount (steering angle) based on measured values obtained by the yaw rate sensor 27 and the steering angle sensor 28 and controls each device constituting the steering unit 213 so that the determined steering amount is obtained.

The driving support apparatus 10 includes an obstacle detector 11, a rear vehicle detector 12, an operation controller 13, a collision estimator 14, a rear-end collision determiner 16, an acceleration detector 17, and a boundary line detector 18. Each of the above components 11 to 14 and 16 to 18 each serving as a functional unit is realized by performing a control program stored in advance in a storage unit not shown of the driving support apparatus 10 by a microcomputer not shown of the driving support apparatus 10.

The obstacle detector 11 detects an obstacle present on the front side in the traveling lane of the own vehicle with respect to the own vehicle. The obstacle indicates an object that hinders traveling of the own vehicle in the traveling direction and includes for example, a stopped vehicle, a low-speed vehicle, a fallen object, and a pedestrian. The obstacle may be a moving object or a stationary object. The detection of the obstacle may be performed based on at least one piece of information on captured images acquired by the imaging camera 24 and detection results by the millimeter wave radar 25 and the LiDAR sensor 26.

The rear vehicle detector 12 detects a rear vehicle traveling on the rear side in the traveling lane with respect to the own vehicle. The rear vehicle traveling on the rear side in the traveling lane with respect to the own vehicle indicates, for example, a vehicle traveling behind the own vehicle in the same direction as the traveling direction of the own vehicle and positioned at an inter-vehicle distance to the own vehicle, which is within a predetermined range. The detection of the rear vehicle may be performed based on at least one piece of information on captured images acquired by the imaging camera 24, detection results by the millimeter wave radar 25 and the LiDAR sensor 26, and a communication result by the wireless communication apparatus 29.

The operation controller 13 instructs the operation control apparatus 200 to perform control. Specifically, when an obstacle is present on the front side in the traveling lane of the own vehicle with respect to the own vehicle, the operation controller 13 determines an avoiding operation for controlling the own vehicle to avoid the obstacle and instructs the operation control apparatus 200 to control the own vehicle to perform the avoiding operation so that the own vehicle avoids the obstacle. The avoiding operation includes a lane change operation for changing the traveling lane to a lane adjacent to the traveling lane, a steering operation for steering in the traveling lane, and a braking operation for applying a brake in the traveling lane. The determination of the avoiding operation will be described later. The lane adjacent to the traveling lane indicates, for example, an adjacent lane extending in the same traveling direction as the traveling lane of the own vehicle and an oncoming lane of which traveling direction is opposite to the traveling lane of the own vehicle. It is noted that controlling the own vehicle to avoid the obstacle means controlling the own vehicle to perform the avoiding operation to avoid the obstacle. Therefore, there may be a situation in which the own vehicle cannot completely avoid the obstacle, for example, due to moving of the obstacle influenced by wind.

When an obstacle is present on the front side in the traveling lane of the own vehicle with respect to the own vehicle, the collision estimator 14 estimates presence or absence of a collision between the rear vehicle and the obstacle, that is, whether a collision between the rear vehicle and the obstacle will occur in the case in which the own vehicle avoids the obstacle by one avoiding operation of the lane change operation and the steering operation in the traveling lane. Specifically, the collision estimator 14 predicts the positions of the rear vehicle and the obstacle and the situation of the lane adjacent to the traveling lane in the case in which the own vehicle avoids the obstacle and estimates the presence or absence of the collision between the rear vehicle and the obstacle based on the predicted positions and situation in addition to the current positions of the rear vehicle and the obstacle and the current situation of the lane adjacent to the traveling lane. The situation of the lane adjacent to the traveling lane indicates, for example, positions, sizes, and speeds of other vehicles in lanes including the adjacent lane and the oncoming lane. The presence or absence of the collision between the rear vehicle and the obstacle may be estimated based on at least one piece of information on captured images acquired by the imaging camera 24, detection results by the millimeter wave radar 25 and the LiDAR sensor 26, and a communication result by the wireless communication apparatus 29.

When an obstacle is present on the front side in the traveling lane of the own vehicle with respect to the own vehicle, the rear-end collision determiner 16 determines presence or absence of a rear-end collision of the rear vehicle with the own vehicle in the case in which the own vehicle performs the braking operation to avoid the obstacle. The determination of the presence or absence of the rear-end collision will be described later.

The acceleration detector 17 detects the acceleration of the rear vehicle along the direction from the rear side to the front side in the traveling lane with respect to the own vehicle, that is, along the traveling direction. A detected acceleration is a positive value, which indicates that the rear vehicle accelerates. The detected acceleration is zero, which indicates that the rear vehicle travels at a constant speed. The detected acceleration is a negative value, that is, less than zero, which indicates that the rear vehicle decelerates. The detection of the acceleration of the rear vehicle may be performed based on at least one piece of information on detection results by the millimeter wave radar 25 and the LiDAR sensor 26 and a communication result by the wireless communication apparatus 29.

The boundary line detector 18 detects a boundary line between the traveling lane in which the own vehicle travels and a region adjacent to the traveling lane. Specifically, the boundary line detector 18 detects the boundary line, which corresponds to a boundary in the width direction to define the traveling lane, constituted in an arbitrary manner, including a white line and lines of other colors that are drawn on the road surface, a portion protruding like a band along the traveling lane on the road surface, and a step constituting a sidewalk. The detection of the boundary line may be performed based on at least one piece of information on captured images acquired by the imaging camera 24 and detection results by the millimeter wave radar 25 and the LiDAR sensor 26.

The driving support apparatus 10 having the above-described configuration, performs a later-described driving support process to avoid the collision between the rear vehicle and the obstacle while the collision between the own vehicle and the obstacle is avoided when the obstacle is present on the front side in the traveling lane with respect to the own vehicle.

A-2. Driving Support Process

Figure 2:
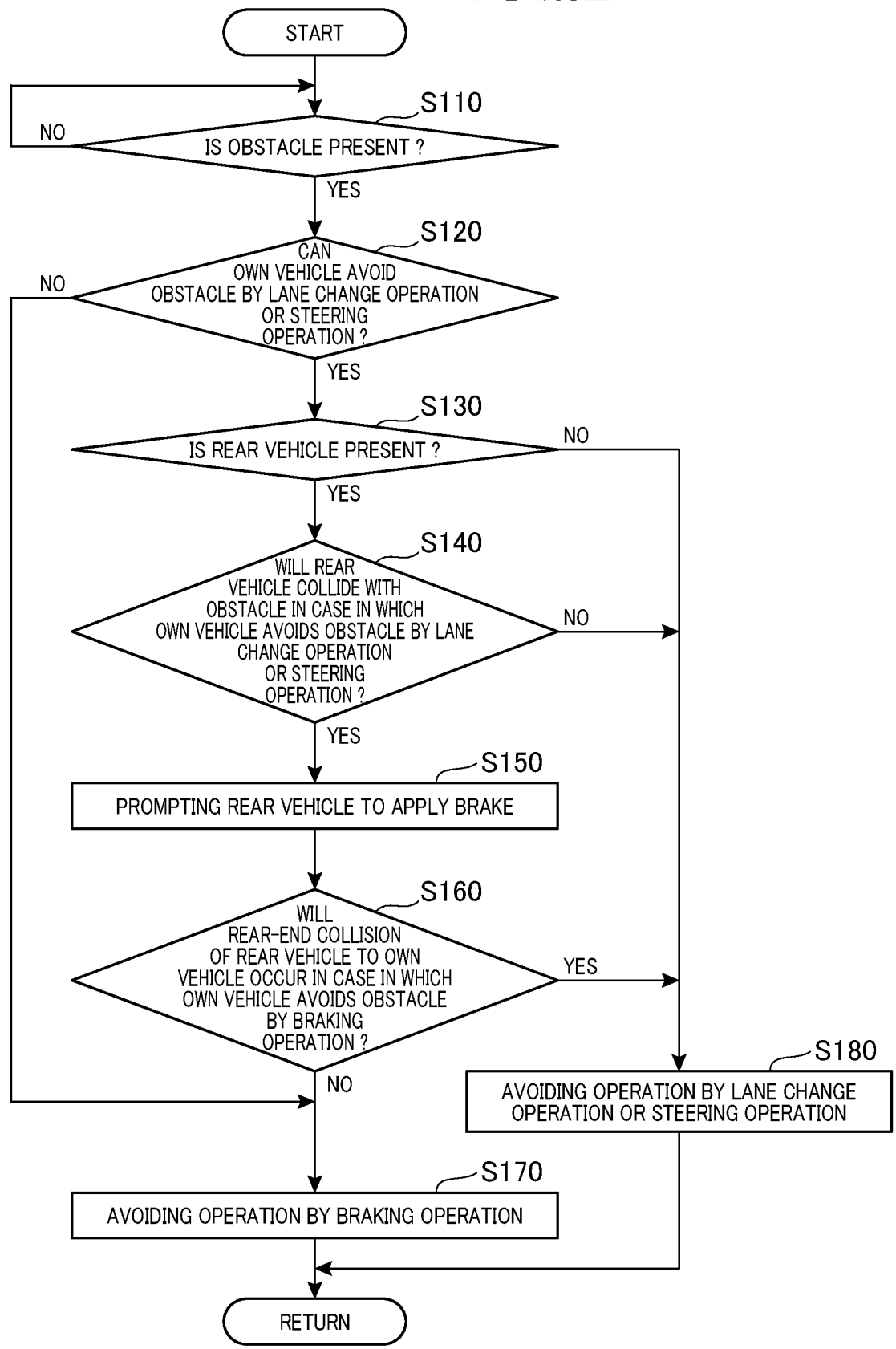
FIG. 2 is a flowchart showing a procedure of a driving support process in a first embodiment of the present disclosure.

When the ignition of the own vehicle is turned on, the driving support apparatus 10 performs the driving support process. Referring to FIG. 2, the driving support apparatus 10 determines whether an obstacle is present on the front side in the traveling lane of the own vehicle with respect to the own vehicle based on a detection result detected by the obstacle detector 11 (step S110). When the driving support apparatus 10 determines that no obstacle is present (step S110: NO), step S110 is performed again.

When the driving support apparatus 10 determines that an obstacle is present (step S110: YES), the driving support apparatus 10 determines whether the own vehicle can avoid the obstacle by a lane change operation or a steering operation in the traveling lane (step S120).

Figure 3:
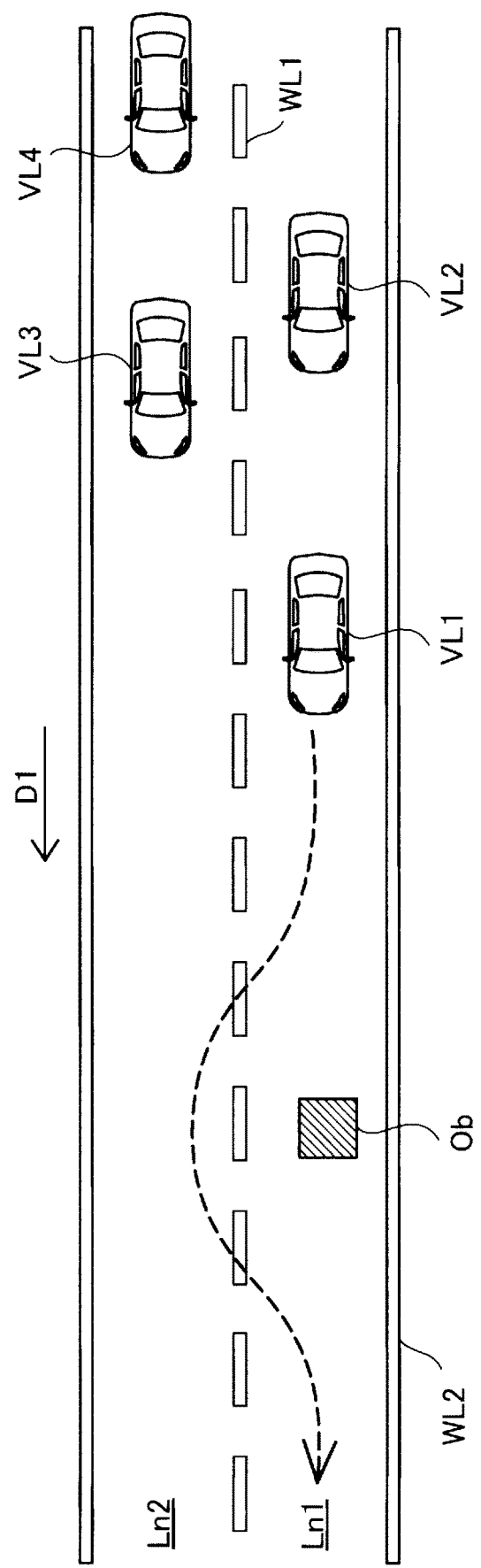
FIG. 3 is an explanatory diagram explaining a situation in which an obstacle is present on a front side in a traveling lane of an own vehicle with respect to the own vehicle.

In an example shown in FIG. 3, an own vehicle VL1 travels in a traveling direction D1 and an obstacle Ob is present on the front side in a traveling lane Ln1 of the own vehicle VL1 with respect to the own vehicle VL1. A rear vehicle VL2 is present on the rear side in the traveling lane Ln 1 with respect to the own vehicle VL1. An adjacent lane Ln2 adjacent to the traveling lane Ln1 is a lane extending in the traveling direction D1 as well as the traveling lane Ln1. Other vehicles VL3 and VL4 travel in the adjacent lane Ln2. As shown in FIG. 3, a boundary line WL1 is indicated between the traveling lane Ln1 and the adjacent lane Ln2. A boundary line WL2 is indicated on the opposite side of the traveling lane Ln1 to the boundary line WL1.

In step S120 shown in FIG. 2, the driving support apparatus 10 determines whether the own vehicle VL1 can avoid the obstacle Ob by the lane change operation or the steering operation in the traveling lane Ln1 based on the space existing in the traveling lane Ln1 and the adjacent lane Ln2, the positions of the other vehicles VL3 and VL4 traveling in the adjacent lane Ln2, the relative speeds of the other vehicles VL3 and VL4 with respect to the own vehicle VL1, the position and size of the obstacle Ob, and the relative speed of the obstacle Ob with respect to the own vehicle VL1. Since the example shown in FIG. 3 indicates the situation in which the own vehicle VL1 can avoid the obstacle Ob by traveling at a predicted trajectory T1 indicated by the broken line arrow, the driving support apparatus 10 determines that the own vehicle VL1 can avoid the collision. The predicted trajectory T1 indicates that the own vehicle VL1 temporarily travels in the adjacent lane Ln2 by the steering operation, that is, that the own vehicle VL1 performs the lane change operation to the adjacent lane Ln2 and then performs the lane change operation again to return to the traveling lane Ln1. Instead of the predicted trajectory T1, the driving support apparatus 10 may determine that the own vehicle VL1 can avoid the collision with the obstacle Ob by a trajectory at which the avoidance of a collision between the own vehicle VL1 and the obstacle Ob is realized only by the steering operation in the traveling lane Ln1 or only by the lane change operation to the adjacent lane Ln2.

In step S120 shown in FIG. 2, when the driving support apparatus 10 determines that the own vehicle VL1 cannot avoid the obstacle Ob by the lane change operation or the steering operation in the traveling lane Ln1 (step S120: NO), the operation controller 13 determines that the avoiding operation is performed by the braking operation (applying a brake) to control the own vehicle to avoid the obstacle Ob (step S170). After step S170 is performed, the control process returns to step S110. For example, unlike the situation shown in FIG. 3, when the own vehicle VL1 cannot avoid the obstacle Ob by the lane change operation or the steering operation in the traveling lane Ln1, the operation controller 13 determines that the avoiding operation is performed by the braking operation. In this case, the operation controller 13 outputs a command for the braking operation to the operation control apparatus 200 to control the own vehicle VL1 to perform the braking operation to avoid the obstacle Ob. As a result, the collision between the own vehicle VL1 and the obstacle Ob is avoided.

On the other hand, as shown in FIG. 3, when the driving support apparatus 10 determines that the own vehicle VL1 can avoid the obstacle Ob by the lane change operation or the steering operation (step S120 in FIG. 2: YES), the driving support apparatus 10 determines whether a rear vehicle is present based on a result detected by the rear vehicle detector 12 (step S130). Unlike the situation shown in FIG. 3, when the driving support apparatus 10 determines that no rear vehicle is present, (step S130: NO), the operation controller 13 determines that the avoiding operation is performed by the lane change operation or the steering operation in the traveling lane Ln1 to control the own vehicle VL1 to avoid the obstacle Ob (step S180). After step S180 is performed, the control process returns to step S110. In this case, the operation controller 13 outputs a command for the lane change operation or the steering operation in the traveling lane Ln1 to the operation control apparatus 200 to control the own vehicle VL1 to perform the lane change operation or the steering operation in the traveling lane Ln1 to avoid the obstacle Ob. As a result, the collision between the own vehicle VL1 and the obstacle Ob is avoided. Since no rear vehicle is present, no rear vehicle collides with the obstacle. The operation controller 13 may determine which operation of the lane change operation and the steering operation in the traveling lane Ln1 is performed as the avoiding operation in response to the width of the own vehicle VL1 and the size of the obstacle Ob.

On the other hand, as shown in FIG. 3, when the driving support apparatus 10 determines that the rear vehicle VL2 is present (step S130 in FIG. 2: YES), the driving support apparatus 10 determines whether the rear vehicle VL2 collides with the obstacle Ob based on an estimated result by the collision estimator 14 in the case in which the own vehicle VL1 avoids the obstacle Ob by the lane change operation or the steering operation in the traveling lane Ln1 (step S140). In other words, the driving support apparatus 10 determines whether the rear vehicle VL2 cannot avoid the obstacle Ob in the case in which the own vehicle VL1 avoids the obstacle Ob by the lane change operation or the steering operation in the traveling lane Ln1. The rear vehicle VL2 may avoid the obstacle Ob by any avoiding operation among the lane change operation, the steering operation in the traveling lane Ln1, and the braking operation. It is assumed that the case in which the rear vehicle VL2 collides with the obstacle Ob, includes, for example, the case in which the rear vehicle VL2 cannot change the lane to the adjacent lane Ln2 because there is no space where the rear vehicle VL2 can change the lane due to the presence of the other vehicles VL3 and VL4 traveling in the adjacent lane Ln2, the case in which the collision cannot be avoided by the steering operation within the traveling lane Ln1 because the width of the rear vehicle VL2 is wider than that of the own vehicle VL1, and the case in which the detection of the obstacle Ob by the rear vehicle VL2 is delayed and the collision cannot be avoided by the braking operation because the obstacle Ob present on the front side in the traveling lane Ln1 of the own vehicle VL1 with respect to the own vehicle VL1 is hidden behind by the own vehicle VL1.

When the driving support apparatus 10 determines that the rear vehicle VL2 will not collide with the obstacle Ob (step S140: NO), that is, when the driving support apparatus 10 determines that the rear vehicle VL2 can avoid the obstacle Ob in the case in which the own vehicle VL1 avoids the obstacle Ob by the lane change operation or the steering operation in the traveling lane Ln1, the control process proceeds to step S180. In this case, the operation controller 13 outputs a command for the lane change operation or the steering operation in the traveling lane Ln1 to the operation control apparatus 200 to control the own vehicle VL1 to perform the lane change operation or the steering operation in the traveling lane Ln1 to avoid the obstacle Ob. As a result, the collision between the own vehicle VL1 and the obstacle Ob is avoided and the rear vehicle VL2 can avoid the obstacle Ob, so that the collision between the rear vehicle VL2 and the obstacle Ob is avoided.

On the other hand, when the driving support apparatus 10 determines that the collision between the rear vehicle VL2 and the obstacle Ob will occur (step S140: YES), that is, when the driving support apparatus 10 determines that the rear vehicle VL2 cannot avoid the obstacle Ob by any avoiding operations in the case in which the own vehicle VL1 avoids the obstacle Ob by the lane change operation or the steering operation in the traveling lane Ln1, the driving support apparatus 10 prompts the rear vehicle VL2 to apply a brake (step S150). In the present embodiment, in step S150, the operation controller 13 controls the own vehicle VL1 to temporarily perform the braking operation in order to prompt the rear vehicle VL2 to apply a brake.

Figure 4:
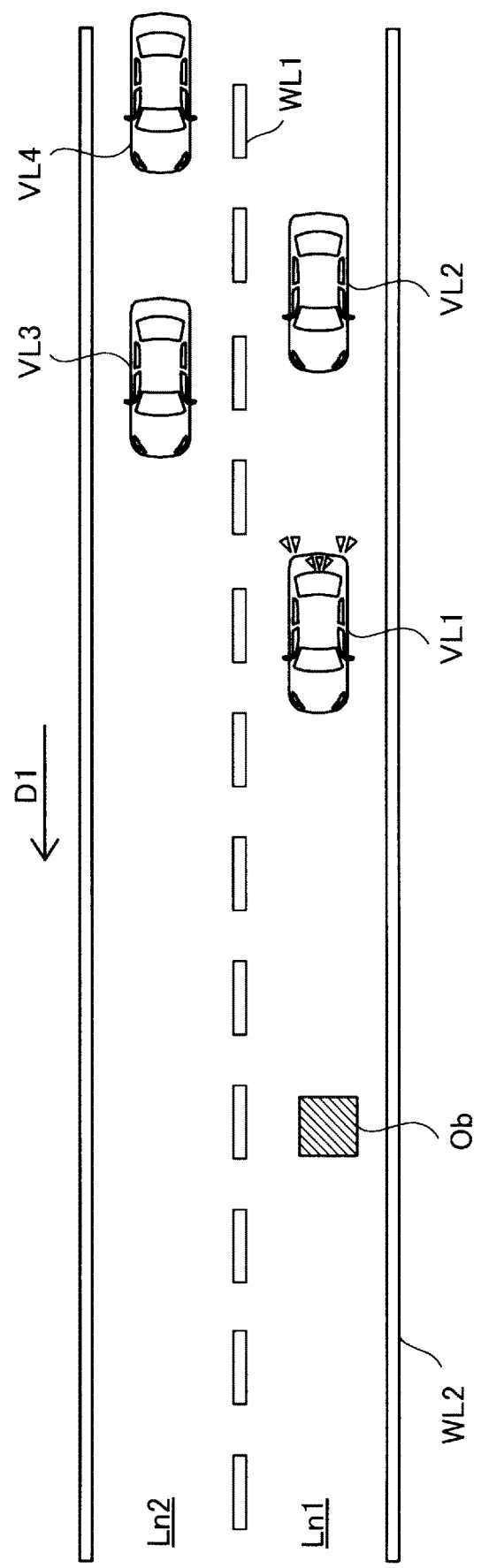
FIG. 4 is an explanatory diagram showing a situation in which performing a braking operation is prompted to a rear vehicle.

In an example shown in FIG. 4, the own vehicle VL1 temporarily performs the braking operation, so that the brake lights of the own vehicle VL1 light. When the own vehicle VL1 temporarily performs the braking operation, it is assumed that the rear vehicle VL2 applies a brake to avoid the rear-end collision to the own vehicle VL1 or excessive narrowing of the inter-vehicle distance by detecting the lighting of the brake lights of the own vehicle VL1 or by detecting the deceleration of the own vehicle VL1. When the rear vehicle VL2 applies a brake, the acceleration of the rear vehicle VL2 becomes a negative value. Instead of controlling the own vehicle VL1 to temporarily perform the braking operation, the rear vehicle VL2 may be prompted to apply a brake by the inter-vehicle communication with the rear vehicle VL2 using the wireless communication apparatus 29.

As shown in FIG. 2, the rear-end collision determiner 16 determines presence or absence of a rear-end collision of the rear vehicle VL2 with the own vehicle VL1 in the case in which the own vehicle VL1 avoids the obstacle Ob by the braking operation (step S160). In the present embodiment, the rear-end collision determiner 16 performs the determination based on a detection result of the acceleration of the rear vehicle VL2, which is detected by the acceleration detector 17 after step S150 is performed. Specifically, the rear-end collision determiner 16 performs the determination based on whether the acceleration of the rear vehicle VL2 is less than zero. The acceleration of the rear vehicle VL2 is less than zero, which means that the rear vehicle VL2 is applying a brake in response to the prompt to apply a brake. That is, there is a low possibility that the rear-end collision of the rear vehicle VL2 with the own vehicle VL1 will occur. On the other hand, the acceleration of the rear vehicle VL2 is zero or more, which means that the rear vehicle VL2 is not applying a brake despite the prompt to apply a brake. That is, there is a possibility that the rear-end collision of the rear vehicle VL2 with the own vehicle VL1 will occur. Thus, in step S160, when the acceleration of the rear vehicle VL2 is less than zero, the rear-end collision determiner 16 determines that no rear-end collision will occur. When the acceleration of the rear vehicle VL2 is zero or more, the rear-end collision determiner 16 determines that the rear-end collision will occur.

When the rear-end collision determiner 16 determines that no collision of the rear vehicle VL2 with the own vehicle VL1 will occur (step S160: NO), the operation controller 13 determines that the avoiding operation for avoiding the obstacle Ob by the own vehicle VL1 is performed by the braking operation (step S170). After step S170 is performed, the control process returns to step S110. In this case, the operation controller 13 outputs a command for performing the braking operation to the operation control apparatus 200 to controls the own vehicle VL1 to perform the braking operation to avoid the obstacle Ob. As a result, the collision between the own vehicle VL1 and the obstacle Ob is avoided. The rear vehicle VL2 continues to perform the braking operation, so that the rear-end collision of the rear vehicle VL2 with the own vehicle VL1 is avoided and the collision between the rear vehicle VL2 and the obstacle Ob is avoided.

On the other hand, when the driving support apparatus 10 determines that the rear-end collision of the rear vehicle VL2 with the own vehicle VL1 will occur (step S160: YES), the operation controller 13 determines that the avoiding operation is performed by the lane change operation or the steering operation in the traveling lane Ln1 to control the own vehicle VL1 to avoid the obstacle Ob (step S180). In this case, the operation controller 13 outputs a command for the lane change operation or the steering operation in the traveling lane Ln1 to the operation control apparatus 200 to control the own vehicle VL1 to perform the lane change operation or the steering operation in the traveling lane Ln1 to avoid the obstacle Ob. As a result, the collision between the own vehicle VL1 and the obstacle Ob is avoided while the rear-end collision of the rear vehicle VL2 with the own vehicle VL1 is avoided.

The known driving support apparatus mentioned introduction avoids a collision between the own vehicle and the rear vehicle traveling behind the own vehicle, which is caused by the avoiding operation. The collision between the rear vehicle and an obstacle is not considered. Therefore, there has been a need for a technique capable of avoiding a collision between the rear vehicle and an obstacle while the own vehicle avoids a collision to the obstacle present on the front side in the traveling lane of the own vehicle with respect to the own vehicle.

In the driving support apparatus 10 according to the first embodiment described above, the collision estimator 14 estimates the presence or absence of the collision between the rear vehicle VL2 and the obstacle Ob and the operation controller 13 determines the avoiding operation to control the own vehicle VL1 to perform based on the estimated presence or absence of the collision. As a result, the collision between the own vehicle VL1 and the obstacle Ob present on the front side in the traveling lane with respect to the own vehicle can be avoided while the collision between the rear vehicle VL2 and the obstacle Ob can be avoided.

The collision estimator 14 predicts the positions of the rear vehicle VL2 and the obstacle Ob and the situation of the lane adjacent to the traveling lane Ln1 in the case in which the own vehicle VL1 performs the lane change operation or the steering operation in the traveling lane Ln1 to avoid the obstacle Ob. Then, the collision estimator 14 estimates the presence or absence of the collision between the rear vehicle VL2 and the obstacle Ob based on the predicted positions and the predicted situation. That is, since the collision estimator 14 estimates the presence or absence of the collision based on the future situation in addition to the current positions of the rear vehicle VL2 and the obstacle Ob and the current situation of the lane adjacent to the traveling lane Ln1, the deterioration of the accuracy to estimate the presence or absence of the collision can be suppressed.

When the driving support apparatus 10 determines that the rear vehicle VL2 collides with the obstacle Ob in the case in which the own vehicle VL1 avoids the obstacle Ob by the lane change operation or the steering operation in the traveling lane Ln1, the driving support apparatus 10 determines the presence or absence of the rear-end collision of the rear vehicle VL2 with the own vehicle VL1 in the case in which the own vehicle VL1 avoids the obstacle Ob by the braking operation. When the driving support apparatus 10 determines that no rear-end collision will occur, the driving support apparatus 10 determines that the avoiding operation by the own vehicle VL1 is performed by the braking operation. That is, when the own vehicle VL1 can avoid the obstacle Ob by the lane change operation or the steering operation in the traveling lane Ln1 and there is a possibility of the collision between the rear vehicle VL2 and the obstacle Ob because the rear vehicle VL2 cannot avoid the obstacle Ob, the own vehicle VL1 is controlled to perform the avoiding operation by the braking operation within a range in which no rear-end collision of the rear vehicle VL2 with the own vehicle VL1 will occur. As a result, the collision between the own vehicle VL1 and the obstacle Ob can be avoided while the collision between the rear vehicle VL2 and the obstacle Ob can be avoided.

When the rear vehicle VL2 does not apply a brake despite the prompt to apply a brake and the own vehicle VL1 is controlled to perform the avoiding operation by the braking operation, there is a possibility that the rear-end collision of the rear vehicle VL2 with the own vehicle VL1 will occur. In particular, when the rear vehicle VL2 travels at a high speed, such as during traveling on a highway and the own vehicle VL1 is controlled to perform the avoiding operation by the braking operation, the braking operation of the rear vehicle VL2 may be not in time, so that the rear-end collision of the rear vehicle VL2 with the own vehicle VL1 may occur. However, when the driving support apparatus 10 according to the present embodiment, determines that the rear-end collision between the rear vehicle VL2 and the own vehicle VL1 will occur, the driving support apparatus 10 determines that the own vehicle VL1 performs the avoiding operation by the lane change operation or the steering operation in the traveling lane Ln1. As a result, the collision between the own vehicle VL1 and the obstacle Ob can be avoided while the rear-end collision of the rear vehicle VL2 with the own vehicle VL1 can be avoided.

Since the driving support apparatus 10 determines the presence or absence of the rear-end collision of the rear vehicle VL2 with the own vehicle VL1 after prompting the rear vehicle VL2 to apply a brake, the driving support apparatus 10 can determine the presence or absence of the rear-end collision of the rear vehicle VL2 with the own vehicle VL1 based on the behavior of the rear vehicle VL2. As a result, in the case in which the own vehicle VL1 is controlled to avoid the obstacle Ob by the braking operation, the driving support apparatus 10 can accurately determine the presence or absence the rear-end collision of the rear vehicle VL2 with the own vehicle VL1. Since the driving support apparatus 10 determines the presence or absence of the rear-end collision of the rear vehicle VL2 with the own vehicle VL1 based on the acceleration of the rear vehicle VL2 along the traveling direction, the driving support apparatus 10 can accurately determine the presence or absence of the rear-end collision.

When the driving support apparatus 10 determines that no rear vehicle VL2 is present, the driving support apparatus 10 determines that the avoiding operation by the own vehicle VL1 is performed by the lane change operation or the steering operation in the traveling lane Ln1. As a result, performing an unnecessary braking operation can be avoided and deterioration of fuel consumption and reduction in convenience of the driver can be suppressed. When the driving support apparatus 10 determines that the rear vehicle VL2 will not collide with the obstacle Ob in the case in which the own vehicle VL1 avoids the obstacle Ob by the lane change operation or the steering operation in the traveling lane Ln1, the driving support apparatus 10 determines that the avoiding operation by the own vehicle VL1 is performed by the lane change operation or the steering operation in the traveling lane Ln1. As a result, performing an unnecessary braking operation can be avoided and deterioration of fuel consumption and reduction in convenience of the driver can be suppressed.

B. Second Embodiment

A driving support apparatus 10 according to the second embodiment is different from the driving support apparatus 10 according to the first embodiment in that step S135 is performed between steps S130 and S140 in the driving support process. Since other configurations of the driving support apparatus 10 according to the second embodiment, including the device configuration are the same as those of the driving support apparatus 10 according the first embodiment, the same components are denoted by the same reference numerals, and the detailed description thereof is omitted.

Figure 5:
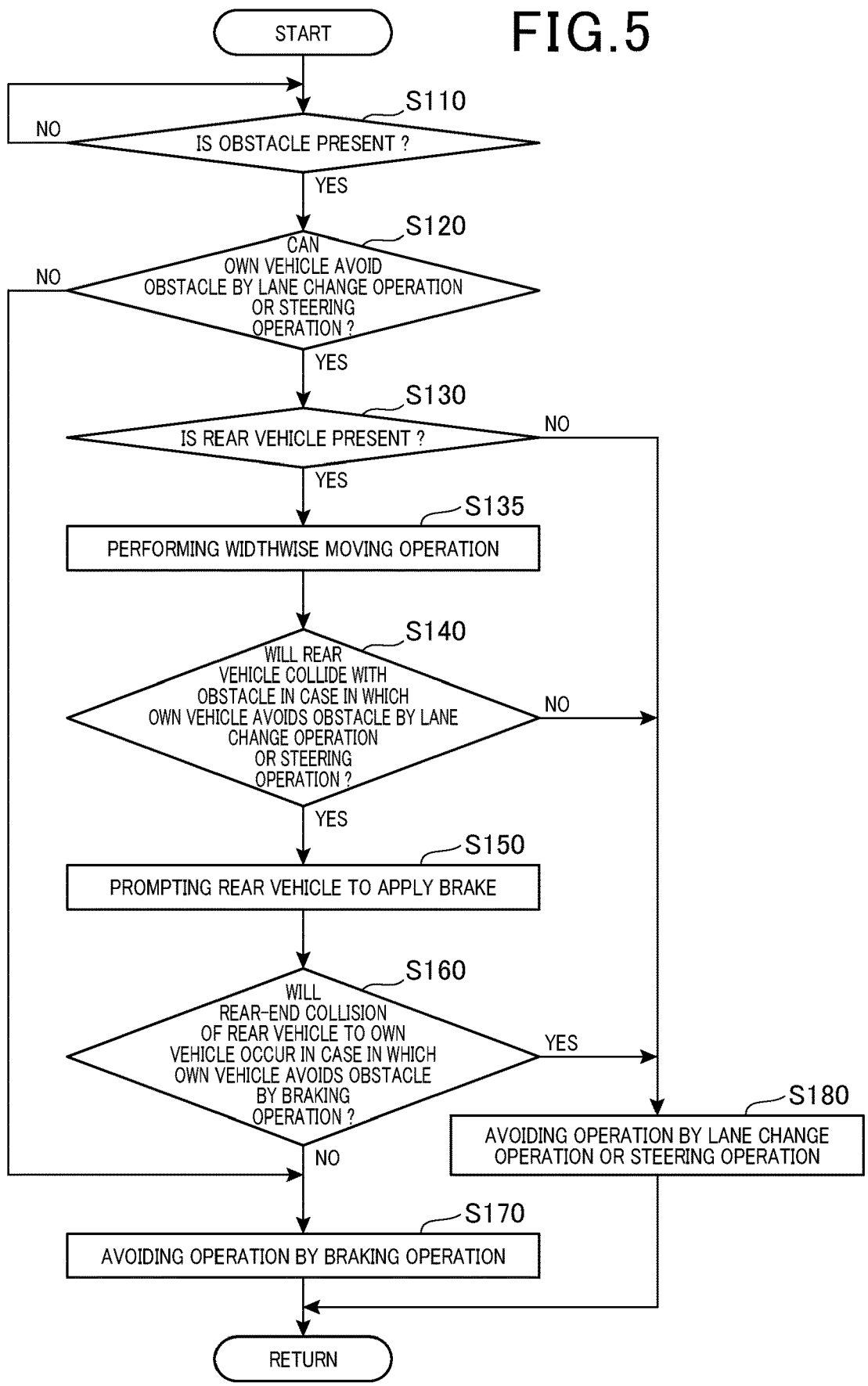
FIG. 5 is a flowchart showing a procedure of a driving support process in a second embodiment of the present disclosure.

As shown in FIG. 5, when the driving support apparatus 10 performs step S130 and determines that the rear vehicle VL2 is present (step S130: YES), the operation controller 13 outputs a command for a widthwise moving operation to the operation control apparatus 200 to control the own vehicle VL1 to perform the widthwise moving operation (step S135). The widthwise moving operation means an operation for moving the own vehicle VL1 closer to one of the boundary lines WL1 and WL2 between the traveling lane Ln1 and regions adjacent to the traveling lane Ln1.

Figure 6:
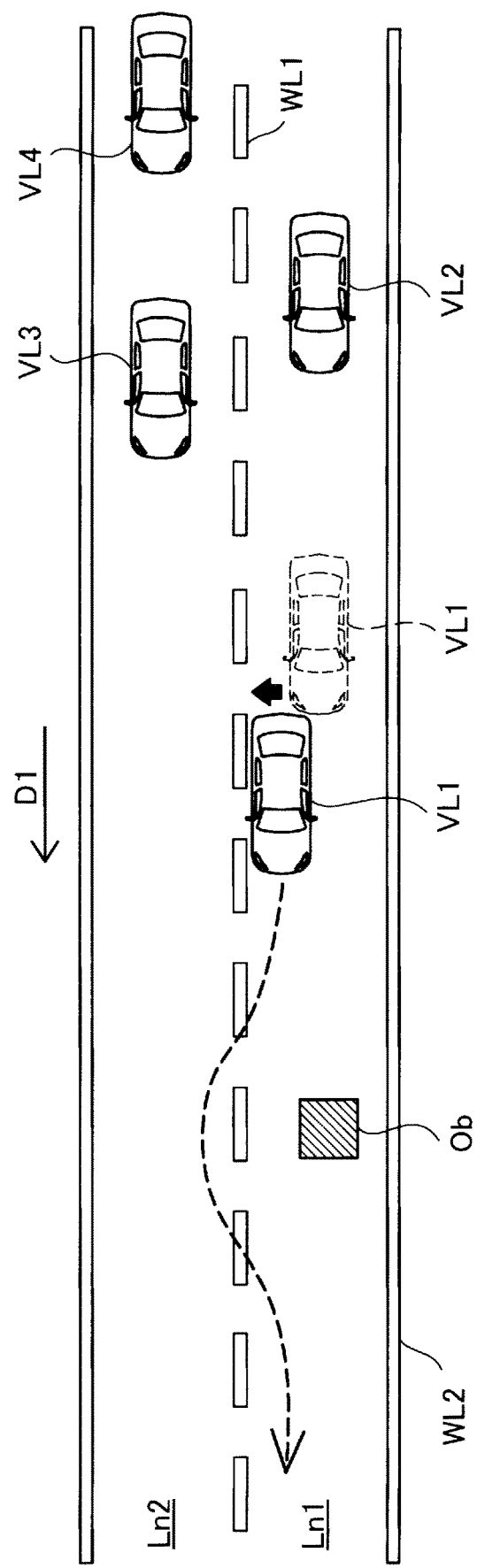
FIG. 6 is an explanatory diagram showing a situation of a widthwise moving operation.

In an example of the widthwise moving operation shown in FIG. 6, the own vehicle VL1 moves closer to the boundary line WL1 between the traveling lane Ln1 and the adjacent lane Ln2. As shown in FIG. 5, after step S135 is performed, step S140 is performed. When the driving support apparatus 10 determines that the own vehicle VL1 can avoid the obstacle Ob by the lane change operation or the steering operation in the traveling lane Ln1 (step S120: YES) and determines that the rear vehicle VL2 is present (step S130: YES), the operation controller 13 controls the own vehicle VL1 to perform the widthwise moving operation and then to perform the avoiding operation. In the example shown in FIG. 6, after the operation controller 13 controls the own vehicle VL1 to perform the widthwise moving operation and then to perform the lane change operation to the adjacent lane Ln2, the operation controller 13 controls the own vehicle VL1 to perform the lane change operation again to return to the traveling lane Ln1 so that the own vehicle VL1 avoids the obstacle Ob.

The driving support apparatus 10 according to the second embodiment, described above, has the same advantageous effects as those of the driving support apparatus 10 according to the first embodiment. In addition, since the own vehicle VL1 is controlled to perform the widthwise moving operation and then to perform the avoiding operation, the widthwise moving operation can prevent the obstacle Ob present on the front side in the traveling lane Ln1 with respect to the own vehicle VL1 from being hidden by the own vehicle VL1. As a result, since the detection of the obstacle Ob by the rear vehicle VL2 can be prevented from being delayed, the collision between the rear vehicle VL2 and the obstacle Ob can be avoided more reliably. Furthermore, since the own vehicle VL1 is controlled to perform the widthwise moving operation so that the own vehicle VL1 moves closer to the boundary line WL1 between the traveling lane Ln1 and the adjacent lane Ln2, the subsequent lane change operation can be easily performed.

C. Modifications (1) The collision estimator 14 of the driving support apparatus 10 according to the first and the second embodiments, predicts the positions of the rear vehicle VL2 and the obstacle Ob and the situation of the lane adjacent to the traveling lane Ln1 in the case in which the own vehicle VL1 is controlled to perform the avoiding operation to avoid the obstacle Ob and estimates the presence or absence of the collision between the rear vehicle VL2 and the obstacle Ob based on the predicted positions and situation, but the present disclosure is not limited to the configuration. For example, the predictions of the positions of the rear vehicle VL2 and the obstacle Ob and the situation of the lane adjacent to the traveling lane Ln1 in the case in which the own vehicle VL1 is controlled to perform the avoiding operation to avoid the obstacle Ob may be omitted. In such a configuration, for example, the collision estimator 14 may estimate the presence or absence of the collision between the rear vehicle VL2 and the obstacle Ob based on the current positions of the rear vehicle VL2 and the obstacle Ob and the current situation of the lane adjacent to the traveling lane Ln1. The collision estimator 14 may estimate that the collision between the rear vehicle VL2 and the obstacle Ob will occur regardless of the positions of the rear vehicle VL2 and the obstacle Ob. The driving support apparatus 10 having the above configuration as other embodiments, has the same advantageous effects as those of the driving support apparatus 10 according to the first and the second embodiments.

(2) The driving support process in the driving support apparatus 10 according to the first and the second embodiments is merely an example, but may be modified variously. For example, step S150 may be omitted. The driving support apparatus 10 may be configured to determine the presence or absence of the rear-end collision of the rear vehicle VL2 with the own vehicle VL1 without prompting the rear vehicle VL2 to apply a brake. In such a configuration, for example, the presence or absence of the rear-end collision may be determined based on the inter-vehicle distance and the relative speed between the own vehicle VL1 and the rear vehicle VL2. In the second embodiment, for example, the presence or absence of the rear-end collision may be determined based on the behavior of the rear vehicle VL2, such as a change in the acceleration of the rear vehicle VL2 after the widthwise moving operation is performed. That is, in general, the rear-end collision determiner 16 is provided to determine the presence or absence of the rear-end collision of the rear vehicle VL2 with the own vehicle VL1 in the case in which the own vehicle VL1 is controlled to avoid the obstacle Ob by the braking operation. When the rear-end collision determiner 16 determines that no rear-end collision will occur, the operation controller 13 may determine that the avoiding operation by the own vehicle VL1 is performed by the braking operation. When the rear-end collision determiner 16 determines that the rear-end collision will occur, the operation controller 13 may determine that the avoiding operation by the own vehicle VL1 is performed by one of the lane change operation and the steering operation. In such a configuration, the operation controller 13 determines the avoiding operation based on the presence or absence of the rear-end collision of the rear vehicle VL2 with the own vehicle VL1 in the case in which the own vehicle VL1 is controlled to avoid the obstacle Ob by the braking operation. As a result, the collision between the own vehicle VL1 and the obstacle Ob can be avoided while the rear-end collision of the rear vehicle VL2 with the own vehicle VL1 can be avoided.

(3) The configurations of the driving support apparatus 10 according to the first and the second embodiments are merely an example, but may be modified variously. For example, in the driving support apparatus 10 according to the first embodiment, the boundary line detector 18 may be omitted. For example, the rear-end collision determiner 16 and the acceleration detector 17 of the driving support apparatus 10 may be omitted and steps S150 and S160 of the driving support process may be omitted. That is, in general, when the collision estimator 14 estimates that a collision will occur, the operation controller 13 may determine that the avoiding operation is performed by the braking operation. In such a configuration as well, the collision between the own vehicle VL1 and the obstacle Ob can be avoided while the collision between the rear vehicle VL2 and the obstacle Ob can be avoided.

(4) In the driving support process of the driving support apparatus 10 according to the first and the second embodiments, the rear-end collision determiner 16 determines the presence or absence of the rear-end collision based on the acceleration of the rear vehicle VL2 along the traveling direction, but the present disclosure is not limited to the driving support process. For example, the rear-end collision determiner 16 may determine the presence or absence of the rear-end collision based on the relative speed of the rear vehicle VL2 with respect to the own vehicle VL1 instead of the acceleration of the rear vehicle VL2. In such a driving support process, for example, when the relative speed is a positive value, that is, when the absolute speed of the rear vehicle VL2 is greater than that of the own vehicle VL1, the rear-end collision determiner 16 may determine that the rear end collision will occur. For example, the rear-end collision determiner 16 may determine the presence or absence of the rear-end collision based on a result of the inter-vehicle communication or the road-to-vehicle communication. The driving support apparatus 10 having such a driving support process as other embodiments, has the same advantageous effects as those of the driving support apparatus 10 according to the first and the second embodiments.

(5) In the driving support process of the driving support apparatus 10 according to the second embodiment, the widthwise moving operation is an operation for moving the own vehicle VL1 closer to the boundary line WL1, but may be an operation for moving the own vehicle VL1 closer to the boundary line WL2 positioned on the opposite side to the traveling lane Ln1 with respect to the boundary line WL1 instead of the boundary line WL1. For example, when the obstacle Ob is present near the boundary line WL1, the widthwise moving operation for moving the own vehicle VL1 closer to the boundary line WL2 may be performed. The widthwise moving operation may be performed at a timing other than the timing between steps S130 and S140. For example, the widthwise moving operation may be performed at the timing between steps S110 and S120, between steps S120 and S130, between steps S140 and S150, or between steps S140 and S180. The driving support apparatus 10 having such a configuration on the width moving operation, has the same advantageous effects as those of the driving support apparatus 10 according to the second embodiment.

(6) In each embodiment, a part of the configuration realized by hardware may be replaced with software. On the contrary, a part of the configuration realized by software may be replaced with hardware. For example, at least one functional unit of the obstacle detector 11, the rear vehicle detector 12, the operation controller 13, the collision estimator 14, the rear-end collision determiner 16, the acceleration detector 17, and the boundary line detector 18 may be realized by an integrated circuit, a discrete circuit, or a module formed by combining the integrated circuit and the discrete circuit. When a part or all of the functions of the present disclosure are realized by software, the software (computer program) may be provided in a form stored in a computer-readable recording medium. The computer-readable recording medium is not limited to a portable storage medium such as a flexible disk and a CD-ROM, but may include an internal storage device in a computer, such as various RAMs and ROMs and an external storage device connected to a computer, such as a hard disk. That is, the computer-readable recording medium has a broad meaning, including an arbitrary recording medium that is non-temporary storage of data packets.

The present disclosure may be realized in various aspects. For example, the present disclosure may be realized in aspects such as a vehicle having a driving support apparatus, a driving support method, and a computer program for realizing the apparatus and the method.

The present disclosure is not limited to each embodiment described above, but may be realized by various configurations within a scope not departing from the spirit of the disclosure. For example, the technical features in each embodiment, corresponding to the technical features of the aspects described in the summary may be replaced or combined as appropriate to solve a part or all of the above-described problems or to achieve a part or all of the above-described advantageous effects. Unless the technical features are described as being an essential feature in the present specification, the technical features may be omitted as appropriate.

What is claimed is:

1. A driving support apparatus for a vehicle, comprising:
   a non-transitory memory storing one or more computer programs; and
   a processor executing the one or more computer programs to:
   detect an obstacle present on a front side in a traveling lane in which an own vehicle travels with respect to the own vehicle, the own vehicle being a vehicle carrying the driving support apparatus;
   detect a rear vehicle traveling on a rear side in the traveling lane with respect to the own vehicle;
   determine an avoiding operation by one of a lane change operation for changing the traveling lane to a lane adjacent to the traveling lane, a steering operation for steering in the traveling lane, and a braking operation for applying a brake in the traveling lane and controlling the own vehicle to perform the avoiding operation to avoid the obstacle;
   estimate a presence or absence of a collision between the rear vehicle and the obstacle in a case in which the own vehicle performs the avoiding operation by one of the lane change operation and the steering operation to avoid the obstacle; and
   determining the avoiding operation of the own vehicle based on the estimated presence or absence of the collision between the rear vehicle and the obstacle.

2. The driving support apparatus according to claim 1, wherein the processor predicts positions of the rear vehicle and the obstacle and a situation of the lane adjacent to the traveling lane in the case in which the own vehicle performs the avoiding operation by one of the lane change operation and the steering operation to avoid the obstacle and estimates the presence or absence of the collision based on the predicted positions and the predicted situation.

3. The driving support apparatus according to claim 1, wherein the processor determines that the avoiding operation is performed by the braking operation when estimating the presence of the collision between the rear vehicle and the obstacle.

4. The driving support apparatus according to claim 1, wherein the processor further determines a presence or absence of a rear-end collision of the rear vehicle with the own vehicle in a case in which the own vehicle performs the braking operation to avoid the obstacle, and
   wherein the processor determines that the avoiding operation is performed by the braking operation in response to determining that no rear-end collision will occur, and
   wherein the processor determines that the avoiding operation is performed by one of the lane change operation and the steering operation in response to determining that the rear-end collision will occur.

5. The driving support apparatus according to claim 4, wherein the processor further detects an acceleration of the rear vehicle along a direction from the rear side to the front side, and wherein the processor determines that no rear-end collision will occur when the detected acceleration is less than zero and that the rear-end collision will occur when the detected acceleration is zero or more.

6. The driving support apparatus according to claim 1, wherein the processor further detects a boundary line between the traveling lane and a region adjacent to the traveling lane, and
wherein the processor controls the own vehicle to perform the avoiding operation after controlling the own vehicle to perform a widthwise moving operation for moving the own vehicle closer to the boundary line.

7. A computer-implemented method for performing driving support by an own vehicle, the method comprising:
detecting an obstacle present on a front side of the own vehicle in a traveling lane in which the own vehicle travels;
detecting a rear vehicle traveling on a rear side in the traveling lane with respect to the own vehicle;
determining an avoiding operation using one of a lane change operation for changing the traveling lane to a lane adjacent to the traveling lane, a steering operation for steering in the traveling lane, and a braking operation for applying a brake in the traveling lane and controlling the own vehicle to perform the avoiding operation to avoid the obstacle;
predicting whether the rear vehicle and the obstacle will collide in a case in which the own vehicle performs the avoiding operation using one of the lane change operation and the steering operation to avoid the obstacle; and
determining the avoiding operation of the own vehicle based on predicting whether the rear vehicle and the obstacle will collide.

8. The method according to claim 7, further comprising predicting positions of the rear vehicle and the obstacle and a situation of the lane adjacent to the traveling lane in the case in which the own vehicle performs the avoiding operation by one of the lane change operation and the steering operation to avoid the obstacle and estimates the presence or absence of the collision based on the predicted positions and the predicted situation.

9. The method according to claim 7, further comprising determining that the avoiding operation is performed by the braking operation in response to predicting that the rear vehicle and the obstacle will collide.

10. The method according to claim 7, further comprising:
predicting whether the rear vehicle and the own vehicle will collide in a case in which the own vehicle performs the braking operation to avoid the obstacle; and
determining that the avoiding operation is performed by the braking operation in response to determining that no rear-end collision will occur and that the avoiding operation is performed by one of the lane change operation and the steering operation in response to predicting that the rear vehicle and the own vehicle will collide.

11. The method according to claim 10, further comprising:
detecting an acceleration of the rear vehicle along a direction from the rear side to the front side;
determining that the rear vehicle and the own vehicle will not collide in response to detecting that the acceleration is less than zero; and
determining that the rear vehicle and the own vehicle will collide in response to detecting that the acceleration is greater than or equal to zero.

12. The method according to claim 7, further comprising:
detecting a boundary line between the traveling lane and a region adjacent to the traveling lane; and
controlling the own vehicle to perform the avoiding operation after controlling the own vehicle to perform a widthwise moving operation for moving the own vehicle closer to the boundary line.

* * * * *